United States Patent
Tie et al.

(10) Patent No.: US 9,542,158 B2
(45) Date of Patent: Jan. 10, 2017

(54) T-SEQUENCE APPARATUS AND METHOD FOR GENERAL DETERMINISTIC POLYNOMIAL-TIME PRIMALITY TESTING AND COMPOSITE FACTORING

(76) Inventors: Teck Sing Tie, Sarawak (MY); Shaul O. Backal, Tarzana, CA (US)

( * ) Notice: Subject to any disclaimer, the term of this patent is extended or adjusted under 35 U.S.C. 154(b) by 1661 days.

(21) Appl. No.: 10/306,072

(22) Filed: Nov. 27, 2002

(65) Prior Publication Data
US 2004/0057580 A1    Mar. 25, 2004

Related U.S. Application Data

(63) Continuation of application No. 09/559,142, filed on Apr. 27, 2000, now abandoned.

(60) Provisional application No. 60/145,585, filed on Jul. 26, 1999.

(51) Int. Cl.
| | | |
|---|---|---|
| H04L 29/06 | (2006.01) | |
| G06F 7/72 | (2006.01) | |
| G06F 7/58 | (2006.01) | |
| H04L 9/06 | (2006.01) | |
| H04L 9/30 | (2006.01) | |

(52) U.S. Cl.
CPC ............... *G06F 7/72* (2013.01); *G06F 7/586* (2013.01); *H04L 9/0662* (2013.01); *H04L 9/3033* (2013.01); *G06F 2207/7204* (2013.01)

(58) Field of Classification Search
CPC ............................................ G06F 2207/7204
USPC ......................................................... 380/30
See application file for complete search history.

(56) References Cited

U.S. PATENT DOCUMENTS

| | | |
|---|---|---|
| 744,041 A | 11/1903 | Burke |
| 3,250,855 A | 5/1966 | Vasseur |
| 4,157,454 A | 6/1979 | Becker |
| 4,218,582 A | 8/1980 | Hellman et al. |
| 4,351,982 A | 9/1982 | Miller et al. |
| 4,740,890 A | 4/1988 | William |
| 4,988,987 A | 1/1991 | Barrett et al. |
| 5,058,160 A | 10/1991 | Banker et al. |
| 5,351,298 A | 9/1994 | Smith |
| 5,594,797 A | 1/1997 | Alanara et al. |
| 5,703,948 A | 12/1997 | Yanovsky |
| 5,712,800 A | 1/1998 | Aucsmith |
| 5,771,291 A | 6/1998 | Newton et al. |
| 5,787,172 A | 7/1998 | Arnold |
| 5,835,600 A | 11/1998 | Rivest |
| 6,219,421 B1 * | 4/2001 | Backal ........................... 380/28 |

OTHER PUBLICATIONS

Penzhorn, W T."Fast Algorithm for the Generation of Large Primes for the RSA Cryptosytem." IEEE(1992):169-172.*
Eric W. Weisstein. "Primality Test." From MathWorld—A Wolfram Web Resource. http://mathworld.wolfram.com/PrimalityTest.html.*

(Continued)

*Primary Examiner* — Jason K Gee
(74) *Attorney, Agent, or Firm* — Buchanan Ingersoll & Rooney PC (57) ABSTRACT

A new mathematical technique called the T-sequence is a primality testing method. A similar approach can be applied to perform fast factoring for numerous special cases, a method that can, in all likelihood, be extended to the general case, making possible a general and fast factoring algorithm. The same T-sequence can be used to construct a prime number formula and a good random number generator.

16 Claims, 2 Drawing Sheets

(56) References Cited

OTHER PUBLICATIONS

Eric W. Weisstein. "Lucas Polynomial Sequence." From MathWorld—A Wolfram Web Resource. http://mathworld.wolfram.com/LucasPolynomialSequence.html.*

Eric W. Weisstein. "Chebyshev Polynomial of the First Kind." From MathWorld—A Wolfram Web Resource. http://mathworld.wolfram.com/ChebyshevPolynomialoftheFirstKind.html.*

Stallings, William. "Key Management; Other Public-Key Cryptosystems." Cryptography and Network Security. Upper Saddle River, NJ: Prentice Hall, 2003.306-308.*

See Previous Office Action's References for NPL.* http://mathworld.wolfram.com/ChebyshevBias.html.*

Methods of Primality Testing; MIT Undergraduate Journal of Mathematics, by Zachary S. McGrover-Dorsey, Jun. 1999.*

Schneier, Bruce, Applied Cryptography, 2nd Ed., pp. 170-177, John Wiley & Sons, Inc.

Menezes, Alfred J., et al., Handbook of Applied Cryptography, p. 172, CRC Press.

Schneier, Bruce, Applied Cryptography, 2nd Ed., pp. 183-184, John Wiley & Sons, Inc.

Schneier, Bruce, Applied Cryptography, 2nd Ed., Sec. 17.9 and 19.9, John Wiley & Sons, Inc.

Lucas Sequences in Cryptography, dated Nov. 5, 1997. [retrieved Oct. 12, 2000], Internet<http://www.eskimo.com/~weidai/lucas.html>.

The Prime Glossary: Fortunate Number [ref. Citation Golomb81 (1981)], interenet<http:www.utm.edu/research/primes/glossary/fortunateNumber.html> on Oct. 10, 2000.

Deterministic Primality Testing P. Emerson, Apr. 1998, [retrieved Oct. 10, 2000]; internet<http://middlebury.edu/~pemerson/thesis/node4.html>.

On-line Encyclopedia of Interger Sequences! (1999, AT&T; retrieved Oct. 10, 2000); internet<http://www.research.att.com/~njas/sequences/eisonline.html>.

Koblitz, Neal, Algebraic Aspects of Cryptography. Chapter 7, Section 3.4, Springer.

Press Release from Meganet Corporation website entitled "100% Deterministic Prime Nos. Testing in Fast polynomial Time—a Worldwide Mathematical Breakthrough!"—Wednesday, Dec. 30, 1998, 2 pages.

* cited by examiner

T-SEQUENCE APPARATUS AND METHOD FOR GENERAL DETERMINISTIC POLYNOMIAL-TIME PRIMALITY TESTING AND COMPOSITE FACTORING

BACKGROUND OF THE INVENTION

1. Field of the Invention

The present invention relates to prime and composite number computing and applications of the same, e.g., in the area of data security.

2. State of the Art

Prime numbers (2, 3, 5, 7, 11, 13, . . . , those positive integers divisible only by themselves or 1) are the most fundamental building blocks of math, and with the invention of the public key ciphers (RSA, El Gamal and the like), they now form the backbone of computer security. Basically there are two problems related to the use of prime numbers in these fields, namely primality testing and factoring. The primality testing problem is about testing and determining whether a given arbitrary positive integer is a prime number or a composite (non-prime) number. For a composite number, the factoring problem requires determining the composite number's prime factors. Practicality demands that these two problems have to be solved in polynomial time (computations being proportional to the number of digits and therefore fast), not exponential time (computations being proportional to the size of the numbers themselves and therefore too slow).

Traditionally, to decide whether a small integer is prime or composite, one can try to factor it with the smaller primes, but this trial division is too tedious for numbers greater than, say, 40 digits. Previously, experts have only been able to test for general primality up to about 2000 digits with certainty in a week of standard PC computational time. Several other faster methods have been devised to test larger integers, but they too fall short of expectations.

Presently over the Internet, record-size prime numbers over 10,000 or 100,000 digits are frequently found and published by researchers, but they are confined to special forms only (e.g., the most famous being the Lucas-Lehmer test for Mersenne numbers of the form $2^M-1$). If given an arbitrary number, however, these researchers cannot test it in polynomial time. The stringent demands of several important ciphers require testing and generating large prime number of arbitrary forms and sizes.

There are four conditions in solving these problems:
1. Polynomial-time algorithm: the algorithm's speed needs to be proportional to a small power of the number of digits of that integer, e.g. $d^3$, instead of sub-exponential or exponential time, e.g., $2^d$.
2. 100% generality, i.e., the primality or factors of any arbitrary number can be determined.
3. Provability, i.e., it can be shown to work in all cases mathematically and no counterexamples can be found.
4. Deterministic in nature, i.e., the algorithm can determine the primality of a number with certainty and not with statistical probability.

Present techniques are unable to satisfy all four of these conditions simultaneously.

SUMMARY OF THE INVENTION

Using a new mathematical technique called the T-sequence, the inventor has discovered a powerful primality testing method that meets all four conditions above. A similar approach can be applied to perform fast factoring for numerous special cases, a method that can, in all likelihood, be extended to the general case, making possible a general and fast factoring algorithm. (Researchers heretofore have been able to factor only in sub-exponential time, never in polynomial time.) The same T-sequence can be used to construct a prime number formula (long sought after but never achieved) and a good random number generator. The former can be used to generate infinitely many prime numbers of any size efficiently, and the latter can generate non-periodic and absolutely chaotic random numbers. These numbers are widely used in all areas of industrial and scientific simulations. In general, the T-sequence can be used to handle efficiently the fundamental problems concerning prime numbers (which include primality testing, factoring, prime number formula, infinite-pattern prime problem, etc.).

Whereas previously experts have only been able to test for general primality up to about 2000 digits with certainty in a week of standard PC computational time, now with this new approach it takes only eight seconds, by comparison. On a fast computer, numbers up to a million or more digits can also be tested for primality. All other techniques become impracticable beyond 2000 or so digits for general primality testing. This new approach enables mathematicians and computer scientists to test as well as generate prime numbers of any size or form to be used in mathematical research and computer cryptography.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

T-Sequences: Definition.

Let n be a positive integer and $l \geq 3$ be the order. Then the general T-sequences are defined as follows:

$$T_0^l = 2, \ T_1^l = l \text{ and } T_{n+1}^l = l \cdot T_n^l - T_{n-1}^l,$$

where the subscript denotes the nth term while the superscript denotes the order l. Therefore the zeroth term is always 2 and the first term is always l; i.e., l=3 is the first T-sequence, the successive terms of which are given by $$T_0^3 = 2, \ T_1^3 = 3, \ T_2^3 = 7, \ T_3^3 = 18, \ldots, T_{n+1}^3 = 3 \cdot T_n^3 - T_{n-1}^3.$$

$T_n^4$ is the second T-sequence with the following terms:

$$T_0^4 = 2, \ T_1^4 = 4, \ T_2^4 = 14, \ T_3^4 = 52, \ldots, T_{n+1}^4 = 4 \cdot T_n^4 - T_{n-1}^4, \text{ etc.}$$

There is a general and fundamental identify relating all T terms, as expressed by:

$$T_{n_1+n_2}^l = T_{n_1}^l \cdot T_{n_1-n_2}^l \text{ where } n_1 \geq n_2 \text{ and } n = n_1 + n_2.$$

From this can be derived the following convenient identities:

$$T_{2n+1}^l = T_n^l \cdot T_{n+1}^l - T_1^l = T_n^l \cdot T_{n+1}^l - l \text{ (odd } n\text{th terms)} \tag{1}$$

$$T_{2n}^l = T_n^l \cdot T_n^l - T_0^l = (T_n^l)^2 - 2 \text{ (even } n\text{th terms)} \tag{2}$$

The T terms can grow exponentially large, but with the above identities as well as modulo arithmetic and a type of binary decomposition method described below, testing a given integer for primality is straightforward.

A numerical example serves to illustrate this approach. E.g., for n=31 and l=3, binary decomposition is first performed (other forms of decomposition are feasible but are less practical):

$$T_{31}^3 = T_{16}^3 \cdot T_{15}^3 - 3$$

$$T_{16}^3 = (T_8^3)^2 - 2$$

$$T_{15}^3 = T_8^3 \cdot T_7^3 - 3$$

$$T_8^3 = (T_4^3)^2 - 2$$

$$T_7^3 = T_4^3 \cdot T_3^3 - 3$$

$$T_4^3 = (T_2^3)^2 - 2$$

$$T_3^3 = T_2^3 \cdot T_1^3 - 3$$

$$T_2^3 = (T_1^3)^2 - 2$$

For decomposition of odd terms D the quantity $$\frac{D-1}{2}$$

is computed. If the result is an odd number as in $$\frac{31-1}{2} = 15,$$

1 is added to 15 to give 16 so that 31=16+15. If the result is an even number such as $$\frac{37-1}{2} = 18,$$

again 1 is added to 18 to give 19 so that 37=18+19. The successive terms can then be computed by using the above-mentioned identities. For odd nth terms such as $T_{31}^3$, the quantity $T_1^l$, or l, is always subtracted, which is 3 in this example. For even nth terms such as $T_{16}^3$, the quantity $T_0^l$, or 2, is always subtracted. The fundamental identify allows all these decompositions to be performed. Modulo arithmetic with respect to n and recursive substitutions are then carried out using the fact that, always, $T_0^l=2$ and $T_1^l=l$; that is, $T_0^3=2$, $T_1^3=3$ in this example.

Computations are then started from the smallest term, that is $T_2^3=(T_1^3)^2-2=3^2-2=7$, $T_3^3=T_2^3 \cdot T_1^3-3=7 \cdot 3-3=18$, and so on, with the residues always modulo 31:

$$\begin{vmatrix} T_{31}^3 = T_{16}^3 \cdot T_{15}^3 - 3 = 3 \cdot 2 - 3 = 3 \\ T_{16}^3 = (T_8^3)^2 - 2 = 6^2 - 2 = 3 \\ T_{15}^3 = T_8^3 \cdot T_7^3 - 3 = 6 \cdot 6 - 3 = 2 \\ T_8^3 = (T_4^3)^2 - 2 = 16^2 - 2 = 6 \\ T_7^3 = T_4^3 \cdot T_3^3 - 3 = 16 \cdot 18 - 3 = 6 \\ T_4^3 = (T_2^3)^2 - 2 = 7^2 - 2 = 16 \\ T_3^3 = T_2^3 \cdot T_1^3 - 3 = 7 \cdot 3 - 3 = 18 \\ T_2^3 = (T_1^3)^2 - 2 = 3^2 - 2 = 7 \end{vmatrix}$$

Therefore it can be determined that in this example the 31st term of $T^3$ (mod 31) gives a residue of 3. Of course the residue of any term of $T^l$ (mod n) can be readily computed whenever needed.

There are numerous intriguing properties of T-sequences, one of which is expressed as $$T_n^l = \left(\frac{l+\sqrt{l^2-4}}{2}\right)^n + \left(\frac{l-\sqrt{l^2-4}}{2}\right)^n,$$

or equivalently $$T_n^l = \sum_{k=0}^{\left[\frac{n}{2}\right]} (-1)^k \frac{n(n-k-1)!}{k!(n-2k)!} (l)^{n-2k}.$$

From this expression one can prove that all primes p will have to satisfy the relations $T_p^l \equiv l$ (mod p) and $T_{p-1}^l \equiv 2$ or $l^2 \equiv 2$ (mod p), as in the numerical example above for the prime p=31:

$T_{31}^3 \equiv 3$ (mod 31) and $T_{30}^3 \equiv 2$ (mod 30).

By using these T-sequences in connection with the primes p, another important and useful property in primality testing and factoring can be derived, the so-called periods k(p) consisting of two types, p+1 and p−1. The former is called the +l type and the latter the −l type. What is meant by this terminology can be illustrated by the following numerical examples:

Take l=3 and p=7. Compute every term of $T^3$ successively modulo 7; that is, every $T^3$ term is divided by 7 to give the respective residues, until the residues repeat themselves. Thus using R as the residue and l always equal to 3, one obtains for the modulo of prime p=7: $R_0=2$, $R_1=3$, $R_2=0$, $R_3=4$, $R_4=5$, $R_5=4$, $R_6=0$, $R_7=3$, $R_8=2$, .... The next residue with 2 appears at the eighth term $R_8=2$, thus the period k(7)=8. Note that this period divides exactly into p+1, that is, k(p)|p+1 ⇒ k(7)=8. Thus the prime 7 is said to be of the +l type in $T^3$ sequence.

Again take l=4 and p=11. The residues of each $T^4$ term, modulo 11, are: $R_0=2$, $R_2=3$, $R_2=3$, $R_3=8$, $R_4=7$, $R_5=9$, $R_6=7$, $R_7=8$, $R_8=3$, $R_9=4$, $R_{10}=2$, .... The next residue of 2 appears at the 10th term $R_{10}=2$, hence the period k(11)=10. This period of 10 divides exactly into p−1, that is, k(p)|(p−1) ⇒ 10|11−1. Thus the prime 11 is said to be of −l type in $T^4$ sequence.

There are no other possible patterns for prime modulo. (The l type for composites will be shown in the following section describing the primality testing algorithm.) In essence, this unique characteristic of the T-sequences enables the primality of any positive integer to be determined, since only those numbers that are genuine primes can satisfy for appropriate l values both $T_{p-1}^{+l} \equiv l^2-2$, $T_p^{+l} \equiv l$ and $T_{p-1}^{-l} \equiv 2$, $T_p^{-l} \equiv l$ (mod p), Furthermore, this characteristic can also be used to do general polynomial time factoring of composites.

Computing Using T-Sequences

Figure 1:
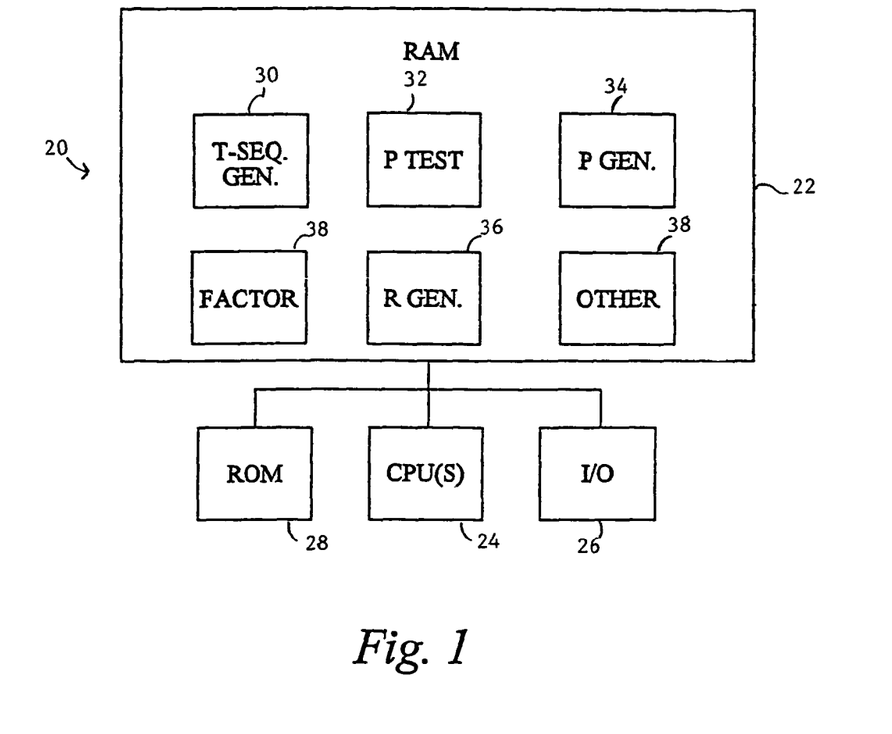
FIG. 1 is a block diagram of a prime number computing system.

Referring now to FIG. 1, a block diagram is shown of a computing system, e.g., a prime number computing system, in which T-sequences are used. The computing system includes one or more processors, random-access memory, read-only (non-volative) memory, and an I/O subsystem. The computing system is intended to be representative of all classes of computing systems, large and small, local or distributed. Within memory is stored a routine for generating T-sequence terms. The results of this routine are used by one or more other routines, e.g., a routine for primality testing, a routine for factoring, a prime number generator, a random number generator, etc. These routines find wide application, especially in data security, e.g., securely encrypting data or, by the opposite token, breaking a given encryption. The operation of various ones of these routines will now be described.

Primality Testing

Given any positive integer n, the $T^3$ sequence may be used to perform primality testing (any other $T^l$ sequence will do but $T^3$ is convenient for use here). Using binary decomposition and the above-mentioned methods, the residues are computed $$R_{n-1}{}^3 = T_{n-1}{}^3 \pmod{n} \text{ and } R_n{}^3 = T_n{}^3 \pmod{n}.$$

For n to be an eligible candidate for prime, the residues have to be $$R_{n-1}{}^3 = 2 \text{ or } l^2 - 2 \text{ and } R_n{}^3 = 3.$$

Any n which does not give such residues can immediately be declared composite.

As will be explained below, it can be seen readily that any n with the last digit 1 or 9 will be of the −1 type in $T^3$, whereas any n with the last digit 3 or 7 will be of the +1 type in $T^3$.

A fast and general method to determine the l type of n in $T^l$ (to be used in proving and determining the genuine primality of n) is as follows. Given the values of any n and l, divide n by the determinant $2l^2-8$ and obtain the small residue r, that is $n \equiv r \pmod{2l^2-8}$. It can be shown that the l type of n is the same as that of r. Since r is so small, direct computation of its residues in $T^l$ will readily give the l type, knowing that by definition the l type is + when $$R_{r-1}{}^l = l^2 - 1 \text{ and } R_r{}^l = l \text{ (both mod } r\text{), and is − when}$$

$$R_{r-1}{}^l = 2 \text{ and } R_r{}^l = l \text{ (both mod } r\text{)}.$$

Note a few facts about the relationships between r and l:
1. The l type is always − whenever r=1.
2. The small residue r must be coprime to the determinant, that is $(r, 2l^2-8)=1$. This means that whenever r is not coprime to $2l^2-8$, that particular l value is not used.
3. Besides r being coprime to the determinant, r needs to be greater than the value of l. Otherwise that particular l value is not used.
4. The period k(r) must be greater than 2. When the period is 1 or 2, that l value is not to be used.
5. Applying the above identities and binary decomposition methods to r will give $R_{r-1}{}^l$ and $R_r{}^l$. Whenever $R_{r-1}{}^l \neq 2$ or $l^2-2$ and/or $R_r{}^l \neq l$, that particular l value will not be used. When $R_{r-1}{}^l = 2$ or $l^2-2$ and $R_r{}^l = l$, that particular l value will be used.
6. The +1 type and the −1 type occur in equal proportion among all n and $T^l$. It can be shown that one l with +l type and another l with −l type can readily be found for any n.

For example, when n=31, l=3 observe that r=1 since $31 \equiv 1 \pmod{2 \cdot 3^2 - 8 = 10}$. It is then known from the facts above that 31 is of −l type in $T^3$. On the other hand, when n=37, l=3 observe that r=7 since $37 \equiv 7 \pmod{2 \cdot 3^2 - 8 = 10}$. The quantities $R_{7-1}{}^3 = 7$ and $R_7{}^3 = 3$ (both mod 7) are then computed, from which it appears that 7 is of +l type in $T^3$. Hence 37 is also of +l type in $T^3$.

To take another example, when n=31, l=4 observe that r=7 since $31 \equiv 7 \pmod{2 \cdot 4^2 - 8 = 24}$. Direct computations like those mentioned above give $R_{7-1}{}^4 = 7$ and $R_7{}^4 7 = 4$ (both mod 7). This shows that 7 is of +l type in $T^4$ and thus 31 must also be of +l type in $T^4$. On the other hand, when n=37, l=4 observe that r=13 since $37 \equiv 13 \pmod{}$. Similar direct computations give $R_{13-1}{}^4 = 2$ and $R_{13}{}^4 = 4$ (both mod 13). This shows that 13 is of −l type in $T^4$ and thus 37 must also be of −l type in $T^4$. It is seen then that 31 and 37 are of opposite l type in $T^3$ and $T^4$.

Note that these small r residue computations can be skipped and the n residues computed directly for primality testing and l-type decisions whenever r is indeterminate. The whole-algorithm will still be in polynomial time owing to binary decomposition, which ensures that it is in polynomial time. The complexity is of the order of $(\log_2 n)^3$.

Figure 2:
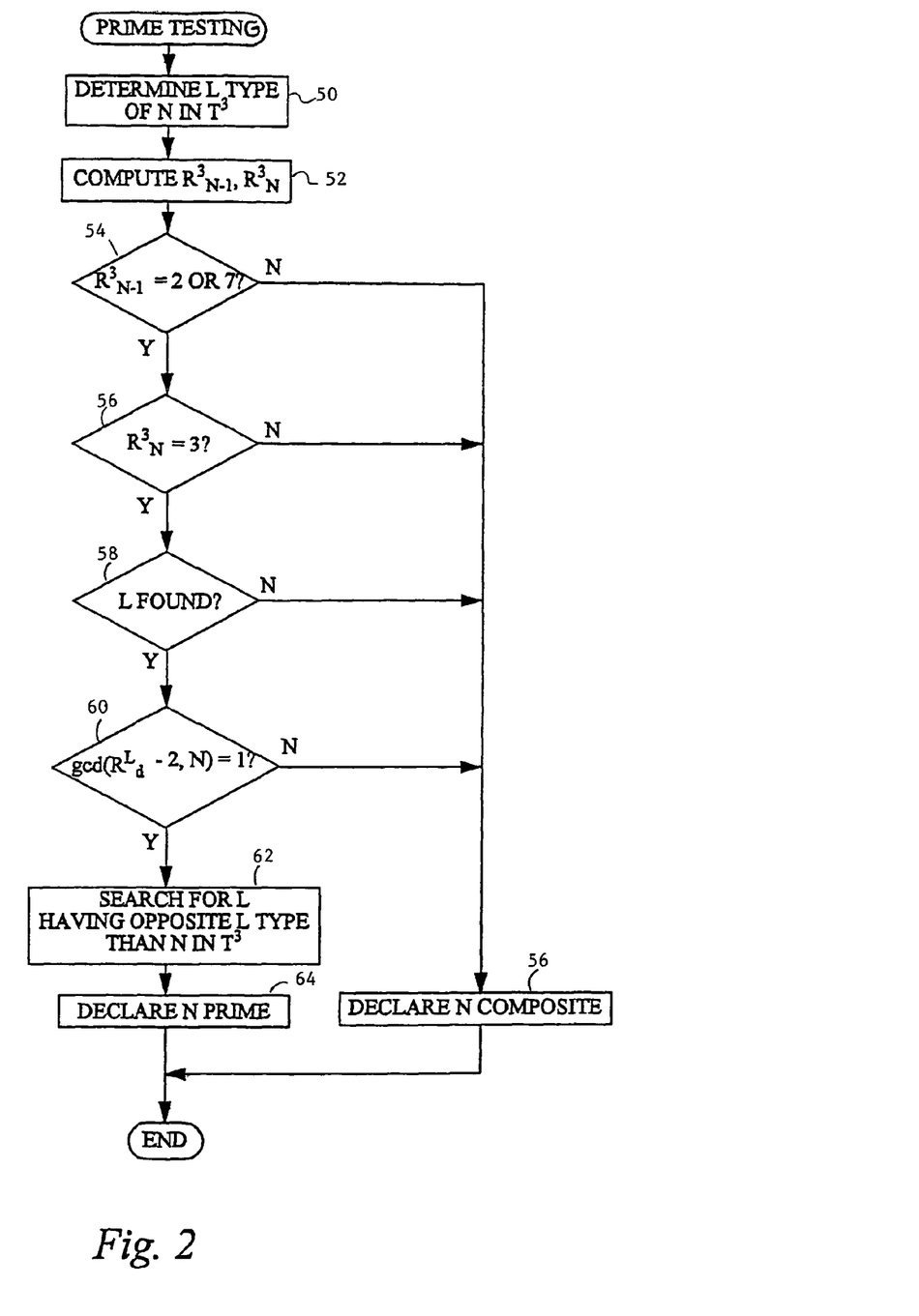
FIG. 2 is a flowchart illustrating a primality testing algorithm.

Referring now to FIG. 2, a fast primality testing routine consists of the following three steps:

STEP A: For any given positive integer n, first use l=3. From the above, determine the l type of n in $T^3$, −l type for last digit 1 or 9, +l type for last digit 3 or 7. Then compute the two residues $$R_{n-1}{}^3 = T_{n-1}{}^3 \pmod{n} \text{ and } R_n{}^3 = T_n{}^3 \pmod{n}.$$

If either $R_{n-1}{}^3 \neq 2$ or 7 ($=l^2-2$) and/or $R^3{}_n \neq 3$, then n can be declared to be composite and the routine stops here.

Note that all composites which are not genuine primes or pseudoprimes or proper cofactors of $T^3$ will be detected and sieved away in this STEP A.

If $R_{n-1}{}^3 = 2$ or $7(=l^2-2) \pmod{n}$ and $R_n{}^3 = 3 \pmod{n}$ then proceed to STEP B below.

STEP B: This step performs a "greatest common factor sieving" to sieve away certain pseudoprimes. For example, take a composite $n = 1729 = 7 \times 13 \times 19$ and l=4. The number 1729 is a pseudoprime of $T^4$ since $$T_{1729}{}^4 = T_{865}{}^4 \cdot T_{864}{}^4 - T_1{}^4 = 914 \cdot 821 - 4 = 4 \pmod{1729}$$

$$T_{865}{}^4 = T_{433}{}^4 \cdot T_{432}{}^4 - T_1{}^4 = 641 \cdot 1458 - 4 = 914 \pmod{1729}$$

Take the odd term right below $T_{1729}{}^4$, that is $T_{865}{}^4$. Since the residue is 914 (mod 1729), subtract from this residue $T_0{}^4$ giving 912. Using the Euclidean algorithm for the greatest common factor (gcd), compute gcd (912, 1729)=19. This shows that 1729 is composite since 19 is one of its factors. (Computing gcd by the Euclidean algorithm is useful in factoring.) In other words, for n to be a candidate for prime, the odd term residue $R_d{}^3$ right under $R_n{}^3$n when 2 is subtracted must at least be coprime to n: $\gcd(R_d{}^l - 2, n) = 1$.

STEP B still misses some pseudoprimes or cofactor composites but when followed by STEP C, all possible exceptions in the form of proper cofactors or pseudoprimes will be sieved away, leaving only the genuine primes.

STEP C: Find an l which is of opposite l type to that in STEP A in $T^3$. If in STEP A the l type of n in $T^3$ is −, then in this STEP C, find an l for which the l type of n is + in $T^l$ and vice versa. This can be determined readily through the above-mentioned computations of small residue r or direct computations of $R_{n-1}{}^3 = 2$ or $l^2 - 2 \pmod{n}$ and $T_n{}^l \equiv l \pmod{n}$.

If in STEP A $T_{n-1}{}^3 \equiv 2 \pmod{n}$ and $T_n{}^3 \equiv 3 \pmod{n}$, that is, −l type, then if for another l in which the l type of n in $T^l$ is opposite to that in $T^3$ it holds that $T_{n-1}{}^l \equiv l^2 - 2 \pmod{n}$ and $T_n{}^l \equiv l \pmod{n}$, that is, +l type, it follows that n must be a genuine prime. If the residues are not as just stated, that n is declared to be composite. It is assured that, when n satisfies these conditions, n must be a genuine prime, because for any composite number, $n=p_1 \cdot p_2$ say, it is impossible to satisfy all + and − divisibility conditions:

$$p_1-1|n-1,\ p_2-1|n-1,\ p_1+1|n+1,\ p_2+1|n+1.$$

Only a genuine prime p can always satisfy these conditions when n=p. This completes STEP C.

A variation of the foregoing algorithm uses the Jacobi to avoid blind trials seeking for opposite l types. In particular, taking JACOBI($l^2-4$, n) gives the l type. One strategy is to calculate the l types beginning with l=3 until the lowest values of l having opposite types have been found.

Primality Testing—Summary.

Following the above method of computation ensures that this primality testing algorithm is 100% general, deterministic, provable and polynomial-time. It runs as follows:

The integer n is a genuine prime whenever n satisfies the conditions in these three steps:

STEP A: $T_{n-1}^3 \equiv 2$ or $7 \pmod n$ and $T_n^3 \equiv 3 \pmod n$

STEP B: $\gcd(R_d^3-2, n)=1$

STEP C: $T_{n-1}^l \equiv 2$ or $l^2-2 \pmod n$ and $T_n^l \equiv 1 \pmod n$ where the l type of n in $T^l$ is opposite to that in $T^3$ as in STEP A.

Failing to satisfy any one or more of these conditions will render n to be composite.

As may be seen from Table 1, the time and memory requirements required to test the primality of integers is very small compared to existing methods, and remains comparatively quite small even when testing primality of integers of unprecedented size.

TABLE 1

| 450 Mhz | | Time Needed | | | | Memory |
|---|---|---|---|---|---|---|
| PC Bits | Digits | Seconds | Minutes | Hours | Days | MB |
| 1,000 | 300 | 0.11 | | | | 4.01 |
| 1,260 | 378 | 0.22 | | | | 4.01 |
| 1,587 | 477 | 0.44 | | | | 4.01 |
| 2,000 | 601 | 0.87 | | | | 4.02 |
| 2,520 | 757 | 1.74 | | | | 4.02 |
| 3,175 | 953 | 3.49 | | | | 4.03 |
| 4,000 | 1,201 | 6.98 | | | | 4.03 |
| 5,040 | 1,513 | 13.95 | | | | 4.04 |
| 6,350 | 1,907 | 27.90 | | | | 4.05 |
| 8,000 | 2,402 | 55.81 | | | | 4.06 |
| 10,079 | 3,027 | | 1.86 | | | 4.08 |
| 12,699 | 3,814 | | 3.72 | | | 4.10 |
| 16,000 | 4,805 | | 7.44 | | | 4.13 |
| 20,159 | 6,054 | | 14.88 | | | 4.16 |
| 25,398 | 7,627 | | 29.76 | | | 4.20 |
| 32,000 | 9,610 | | 59.53 | | | 4.26 |
| 40,317 | 12,107 | | | 1.98 | | 4.32 |
| 50,797 | 15,254 | | | 3.97 | | 4.41 |
| 64,000 | 19,219 | | | 7.94 | | 4.51 |
| 80,653 | 24,215 | | | 15.87 | | 4.65 |
| 101,594 | 30,509 | | | | 1.32 | 4.81 |
| 128,000 | 38,438 | | | | 2.65 | 5.02 |

Polynomial-Time Factoring Routine

A promising and viable factoring method is also based on the T-sequences. This method is unlike any previous method.

The T-sequences allow all forms of composites to be factored, without exception, in polynomial time, simply because binary decomposition modulo C is fundamentally polynomial time. So far, mathematicians have only found exponential or sub-exponential time factoring algorithms for composites less than 200 digits, in general, and no polynomial-time factoring exists for even special forms of composites like the Mersenne numbers $2^M-1$, etc. A simple extension of the T sequences, however, immediately provides just such a polynomial-time factoring algorithm (PTFA) for numerous special form composites with infinite membership.

The gist of this PTFA lies in the natural mathematical interrelationships between the composite $C=p_1p_2$, periods of its prime factors $k(p_1)$ and $k(p_2)$, residue r and order l.

The periods of the prime factors with respect to l can only take on the patterns $p_1-1$, $p_1+1$ and $p_2-1$, $p_2+1$. Note that one can always flip the l type to change p−1 to p+1 and vice versa by trying several pairs of l values.

The first important thing to take advantage of in PTFA is that whenever the period residue $r_p$ lies close to p, it can readily be factored. One numerical example will illustrate this:

Take C=91 (=7×13). The possible periods $k(p_{1,2})$ of 7 and 13 are, for 7, 7−1=6, 7+1=8, and for 13, 13−1=12, 13+1=14. When C=91 is divided respectively by each of these four $k(p_{1,2})$ the following period residue $r_p$ are obtained: 1, 3, 7, 7, obtained from 91=1 (mod 6), 91=3 (mod 8), 91=7 (mod 12), 91=7 (mod 14). Note how small the period residue $r_p$ for the prime factor 7 with the −1 type is, namely only 1. This implies that the factor 7 can be sieved out by taking the greatest common factor this way: $\gcd(R_{91-1}^{-l}-2, 91)=7$. When l=6, 7 takes on a −1 type. So $T_{91}^6$ mod 91 is first computed, which gives 76 as residue. Now $T_1^6=6$, and 1 is the $r_p$ for 7−1 in $T_{91}^6$. Thus one is able to factor by taking $\gcd(76-6, 91)=7$. Likewise $T_{90}^6 \equiv 72 \pmod{91}$, therefore one can again factor by taking $\gcd(72-2, 91)=7$ as shown above.

Whenever the periods p+1 or p−1 [match?] the composite C in either the above straightforward way or a simple function like the cubic polynomial below, factoring can always be performed by taking $\gcd(R_{f(C)}^{\pm l} \pm 2, C)=$ one factor; here, −2 is used when the periods p+1 or p−1 divides exactly into f(C) and +2 is used whenever f(C) divided by p+1 or p−1 gives a residue of $$\frac{p \pm 1}{2},$$

as is quite often the case. The expression $R_m^l$ stands for $T_m^l$ (mod C), where m can be any arbitrary term or a function of the composite f(C) to be computed.

Again, to illustrate the this point, when +2 is added to 76 (the residue of $T_{91}^6$ mod 91), factorization can be performed by taking $$\gcd(R_{91}^6 + 2, 91) = \gcd(76+2, 91) = 13 \text{ since } 13+1 \mid 91 - \frac{13+1}{2},$$

i.e. 14|91−7

There are numerous sets of composites that can be factored readily because their factors' periods bear such a simple relationship to C. For example, composites of the form C=p[1+(p+1)(p+2)] can always be factored readily in this way:

$\gcd(R_{C+1}^{+l}-2, C)=p$. For example, take p=11, C=11 (1+12×13)=11×157=1727. By trials, quickly select a particular l for which 11 is of the +1 type. When l=5, 11 is indeed of +1 type. Thus one can compute (mod 1727)=$R_{1728}^5=167$ and can factor in this way: $\gcd(167-2, 1727)=11$.

For C of the form p[1+(p−1)(p−2)] there results $\gcd(R_{C-1}^{-l}-2, C)=p$, e.g., C=23(1+22×21)=23×43=10649, enabling the following factorization: $\gcd(R_{10649-1}^{-l}-2, 10649)=23$. Obviously, one can easily construct or find infinitely many such composites to factor. In general for $C=p[1+m(p+1)]$ where m is any prime or composite, C can always be factored as follows: $\gcd(R_{C+1}{}^{+l}-2, C)=p$. For $C=p[1+m(p-1)]$, simply take $\gcd(R_{C-1}{}^{-l}-2, C)=p$.

Furthermore, often the period of one prime factor of a composite happens to divide into the other prime factor or factors with a small enough residue, e.g., $C=147149=37\times 41\times 94$. In this example, factoring begins by finding by trial that when C has subtracted from it a small number 2, i.e., 147149−2, it gives $$147147 = \frac{41+1}{2}(\bmod 41 + 1)$$

and also $$147147 = \frac{97+1}{2}(\bmod 97 + 1).$$

Factorization then proceeds by taking $\gcd(R_{C-2}{}^{+l}+2, C)=\gcd(R_{147147}{}^{+l}+2, 147149)=41\times 97$. Again it is obvious that there are infinitely many such composites. Quite often too, when C is multiplied by a small integer, the period of a certain factor can divide exactly into this product of C by a small integer, allowing for ready factorization, e.g., $C=41\times 67=2747$. Multiplying C by the small integer 3 gives $2747\times 3=82441$. Originally, $2747=27 \pmod{41-1}$, and 27 is too large a residue period to readily factor. However, $8241=1 \pmod{41-1}$, and 1 is definitely small enough, leading to $\gcd(R_{3C-1}{}^{-l}-2, C)=\gcd(R_{8240}{}^{-l}-2, 2747)=41$. This constitutes another infinite set of composites that can be factored in polynomial time through PTFA by a few trials.

A powerful and very general PTFA method results from taking the cubic polynomial function of C to factor. It works as follows:
$f(C)=aC^3 \pm bC^2 \pm cC^1 \pm d$ where $0 \leq a,b,c,d \leq 4$. The method tests all the possible combinations; actually, there are basically just 497 combinations that need to be computed for their respective $T_{f(C)}{}^{+l} \pmod C$ because the foregoing expression can be rewritten as $f(C)=C(aC^2 \pm bC \pm c) \pm d$, and since c and d will just be integers taken consecutively, the computation lends itself to use of the identity in T-sequences: $T_{n+1}{}^l=1 \cdot T_n{}^l - T_{n-1}{}^l$. Since $0 \leq a$, $b \leq 4$, and since when $a=0$, also $b=0$ and $c=0$ in some cases, the results is only $5\times 2\times 2\times 2\times 5-3=497$ combinations basically. Factorization is performed by taking $\gcd(R_{f\!C}{}^{\pm l} \pm 2, C)=$one factor, where $f(C)$ stays positive. Two arbitrary examples will illustrate. Take $C=641\times 3469 2223629$. Note

|  | mod 640 | mod 642 | mod 3468 | mod 3470 |
| --- | --- | --- | --- | --- |
| $C^1$ | 269 | 383 | 641 | 2829 |
| $C^2$ | 41 | 313 | 1657 | 1421 |
| $C^3$ | 149 | 467 | 929 | 1749 |

Taking $a=1$, $b=+3$, $c=-1$ and $d=-3$, 641 can be factored out by selecting one l for which 641 is of −1 type such as $l=3$: since $22233629=269 \pmod{}$ there results $149+3\times 41-269-3=(269)^3+3(269)^2-269-3=(2223629)^3+3(2223629)^2-2223629-3=f(C)$. Thus 641 can be factored out as follows: $\gcd(R_{f(C)}{}^3-2, C)=641$.

As another arbitrary example, take $C=4567\times 10837=49492579$. Note the fixed relationship between the period residues of each prime factors, particularly when they are the RSA form of two prime composites, e.g., when $C=p_1 \pmod{p_2+1}$, where $p_2$ is the larger prime and $p_1$ is the smaller prime factor. This is only one of the relationships that have been found. Others abound, such as the 641 residue under mod 3468 above and also the 4567 residue under mod 10836 here.

|  | mod 4566 | mod 4568 | mod 10836 | mod 10838 |
| --- | --- | --- | --- | --- |
| $49492579^1$ | 1705 | 2867 | 4567 | 6271 |
| $49492579^2$ | 3049 | 1857 | 9025 | 5177 |
| $49492579^3$ | 2437 | 2299 | 7867 | 5157 |

Again trials show that when $a=3$, $b=-4$, $c=-3$, $d=-4$, $4568|3C^3-4C2-3C-4=f(C)$. Thus a sieve action is achieved by selecting one l for which 4567 carries +l type, e.g., $l=3$. Factorization is performed by taking $\gcd(R_{C+1}{}^{+l}-2, C)=4567$.

This formula can be linked to the fundamental Diophantine Equation $(p \pm 1)x - R_p y = \pm d$ where p and $R_p$ are related by $C=R_p \pmod{p \pm 1}$. This kind of Diophantine Equation is always solvable, e.g., in the previous example $640 \times 3075 - 269 \times 73167 = +3$, giving much theoretical strength to this formula. Also, this method bears a strikingly close relationship to the elliptic curve method. It is general and always polynomial time. No counterexamples have so far been found. Also very effective are the above-mentioned small residue factoring sieve as well as a quadratic polynomial factoring sieve not described here. Composites of an arbitrary number of prime factors can be handled and factored too. A 100% complete and efficient PTFA should be based upon such a formula or similar one.

In addition to the above methods, other factoring methods have been programmed and tested such as:

(A). $R_n{}^l = T_n{}^l \pmod{n}$ is factored by taking $a(R_n{}^l)^2 \pm bR_n{}^l \pm c \pmod{n}$. Taking the gcd of this relation minus 2 allows for factoring. Here $1 \leq a \leq 4$, $-4 \leq b$, $c \leq +4$ and $a \neq 0$. E.g., take $$n = \frac{3^{17}-1}{2} = 64570081 \ (=1871 \times 34511).$$

Take $851=R$, which comes from $64570081=851 \pmod{1871-1}$ and $1870|2(851)^2+851-3$ $(=1870 \times 775)$. Thus factorization can be performed by taking $\gcd(R_{2 \cdot n^2 + n - 3}{}^3 - 2, n) = 1871$.

(B). Compute the four possible residues: (a) $R_n{}^l \pmod{n}$, (b) $R_n{}^l \pmod{1 \cdot n}$, (c) $R_{l \cdot n}{}^l \pmod{n}$ (d) $R_{l \cdot n}{}^l \pmod{1 \cdot n}$. Use the residues as "inputs" for one or more layers of T-sequence modulo computation. Then factor by taking gcd $(R_{l \cdot n \pm R_1 \ldots {}_4 \pm R_1 \ldots {}_4 \pm f} - 2, n) =$ one prime factor. E.g., take the composite $n=2077=31 \times 67$. Let $l=3$, $1 \ n=3 \times 2077=6231$. There result the four Rs:

$$R_{2077}{}^3 \equiv 719 \ (\bmod \ 2077) \tag{a}$$

$$R_{2077}{}^3 \equiv 2796 \ (\bmod \ 6231) \tag{b}$$

$$R_{6231}{}^3 \equiv 1190 \ (\bmod \ 2077) \tag{c}$$

$$R_{6231}{}^3 \equiv 3267 \ (\bmod \ 6231) \tag{d}$$

When $e=1$, $f=-1$, $l=+$ for 67, e.g., $l=3$ there results $$1 \times 2077 + (3267-719)-1=4624=68 \times 68.$$

Factor by taking $\gcd(R_{4624}{}^3-2, 2077)=(2682-2, 2077)=67$.

(C) Another method makes use of the recursive period pattern of certain primes, e.g., $n=2701=37 \times 73$. First compute $T_{2701}{}^3 \equiv 1239 \pmod{2701}$, $T_{2702}{}^3 \equiv 1749 \pmod{2701}$ Square the larger, even term such as 2702 then subtract 2 ($=T_0$), always (mod n), to compute the next even term. For the odd term such as 2701, to compute the next odd term, multiply the odd term by the larger even term and then subtract 1, e.g., (1) 1239 (odd), 1749 (even)–(2) 806 (odd), 1467 (even), where 1239×1749–3=806 (mod 2701) and $(1749)^2 - 2 = 1467$ (mod 2701). Carry on these computations recursively until there emerges a repetitive pattern. Then often factoring can be performed by taking the gcd, e.g., gcd(806–3, 270)=73, also gcd(1467–7, 2701)=73.

(D) Whenever the ratio between the two factors of the composite n is less than 2, one can always factor by adding or subtracting from n by the nearest integer [$\sqrt{4n-4}$], whereupon the residue (mod p±1) is zero or just 1 away from p+1 or p–1, e.g., 37×43=1591 and $$\frac{43}{39} = 1.1621 < 2.$$

Compute [$\sqrt{4 \cdot 1591 - 4}$]=80 and 1591-80=1511. By finding l such as l=4 where 37 is −1 type but not 43, factorization is made possible by taking 1511+1=0 (mod 37−1), i.e., gcd ($R_{1591-[\sqrt{4 \cdot 1591-4}]+1} - 2$, 1591)=37. There are again infinite number of composites with this convenient property, or the factors can be made to lie close in size to one another by simply multiplying the composite by a suitable small integer.

Factoring—Summary.

T-sequences are closely tied in to factoring. There have been described several very promising polynomial-time factoring methods. The cubic polynomial, PTFA seems to work the best, but other lines of attack are feasible too.

Prime Number Formula.

Traditionally, a prime number formula (which has never been found) has always had these requirements:

1) It always gives a prime number for each integer input n=1, 2, 3, 4, . . .

2) It is constructive, i.e., the formula can always be computed to give prime numbers. For example, Mills' formula p=[$A^{3^n}$] gives no clue how to compute a precise value for A and is therefore not constructive.

3) It is forthright, i.e., it takes little time to readily compute the prime number. For example, for the polynomial equation $ax^2 + bx + c = 0$, the formula $$x = \frac{-b \pm \sqrt{b^2 - 4ac}}{2a}$$

is forthright in that it gives the roots readily.

On the face of it, these requirements seem natural enough. Seekers of prime number formula have always exerted their best efforts to find a prime number formula that satisfies these three requirements. The continuing failure to find such a prime number formula has caused many researchers to conclude no such formula exists.

While it appears doubtful that a prime number formula of this type can be constructed, upon reflection, it may be seen that the third requirement is inconsistent with the very definition of prime numbers, namely that they cannot be divided exactly by any other numbers other than themselves and 1. The implication is that the primality of a positive integer n needs to be determined by a legitimate polynomial-time primality testing algorithm. Whether n is prime or composite cannot be ascertained right away. Rather, n must be tested for primality. A prime number formula which is supposed to generate primes and not composites also needs to obey such a fundamental requirement.

Now redefine a prime number formula as one that satisfies the three requirements:

1) It always gives a prime number for each integer input n=1, 2, 3, . . .

2) It is always constructive.

3) It possesses polynomial-time complexity.

Since a prime number formula is in essence one version of a primality testing algorithm; whereas the traditional formulation of a prime number formula is an NP problem, the foregoing formulation recast the problem such that NP→P.

A new prime number formula of the type described may be arrived at by making use of a revised version of the Fortune Conjecture, i.e., $P_{i+1} - P_1 P_2 P_3 \ldots$ Pi is always a prime. This can be shown to be equivalent to the conjecture that the smallest gap between two consecutive primes $P_{i+1}$ and Pi is $(\ln P_i \ln \ln P_i)^2$. If this gap is simplified to $\ln^2 P_i$, then following Euclid's celebrated proof for the infinity of prime numbers, one can easily show that Fortune Conjecture is equivalent to this smallest gap conjecture. The validity of these two conjectures are well substantiated empirically as well as theoretically. It is known that the maximum gap between two consecutive primes must be rounded by the order of ln $P_i$. Any such logarithmic gap will do just fine for the following prime number formula gap or range: $g = (\ln P_1^a P_2^b \ldots P_i^x)^2$. According to Fortune/Smallest Gap Conjecture there is at least one prime between Q and Q+g. The method therefore needs to compute only these sums: $Q+P_{i+1}$, $Q+P_{i+2}$, $Q+P_j$, where $P_j$ is the largest prime smaller than g. There is at least one prime among these sums, and by applying the primality testing method described previously, the primality of each sum can be determined rapidly. Actually, it is also useful to compute the differences: $Q-P_{i+1}$, $Q-P_{i+2}$, . . . $Q-P_j$. It turns out that practically all such differences give not just one but many primes within the range.

One numerical example illustrates this formula clearly: Let $P_1=2$, $P_2=3$, $P_3=5$, and a=2, b=1, x=2. Then $Q=P_1^a P_2^b P_3^x = 2^2 \cdot 3 \cdot 5^2 = 300$, $(\ln 300)^2 \approx 32.5$. That means there is a need to compute only these numbers 300±7, 300±11, 300±13, 300±17, 300±19, 300±23, 300±29, 300±31. (The numbers 300±1 are not computed here). Among these 16 numbers, the foregoing primality testing algorithm or a similar algorithm enables us to sieve out 11 prime numbers. The conjecture tells us that there are at least two primes. The method obtains 11 out of 16; this is a high yield of primes. In fact, even for big numbers this formula or sieve will still yield large quantities of primes consistently, with an estimated or 36.78% of the sums and differences being prime. One condition which must be observed at all times is that $\ln P_1^a P_2^b \ldots P_i^x$ must always be smaller than the next prime after $P_i$, that is $P_{i+1}$.

One can also add or subtract a large product with a small product e.g. $2^2 \cdot 3 \cdot 5^2 = 300$ and $2^2 \cdot 3 = 36$, giving 300+36=336. The smallest gap in this case will be determined by $(\ln 36)^2 = 12.84$. Among the differences 336−5=331 is found to be prime, in line with the conjecture. In short the possible number of candidates for primes can always be minimized so that the greatest number of composites is filtered out beforehand.

Note that $Q+P_i$ can always be arranged in such a way that will best minimize the number of computations needed to sieve out all the primes in any given range. E.g., there is a relatively large gap between 114 and 127. Computing $2 \cdot 3^2 \cdot 5 + 2^3 \cdot 3 = 114$ would require computation of 114+5, 7, 11, 13, i.e., four steps too many. Instead, choose $2^3 \cdot 3 \cdot 5 = 120$ which allows computation of the immediate primes as 120+7=127 and 120−7=113. This gives all primes within that range readily while skipping all the composite candidates simultaneously. In fact, using a few trials and checks beforehand, one can always manage to optimize the yield of primes within the range efficiently. Large primes can then be chunked out much faster and consistently, all the time based on this prime number sieving algorithm.

This approach makes it possible to compute a large prime. This formula, along with adding or subtracting suitable sums or differences, will readily generate many other primes around this large prime.

Random Number Generator

Mathematically a good random number generator (RNG) should be infinitely non-periodic, such that no generated number can be deduced from any previous number. Of course, statistical tests like the chi-square test can be applied to ensure that all digits are distributed 100% randomly with no bias whatsoever. Admittedly, if only math is concerned, a fixed input will always yield a fixed output. Only physical systems like the quantum mechanical systems can give "dynamically genuine" random numbers. Coupling these two notions together, it is possible to construct a powerful and convenient RNG.

First, note the fact that the last digits of all primes, except 2 and 5, can only be 1, 3, 7 and 9. They are distributed absolutely randomly among the infinite set of positive integers. The very definition of prime number demands this, since prime numbers can only be divided exactly by 1 and themselves. Thus by taking the last digits only and ignoring the trivial 2 and 5, from the prime set 3, 7, 11, 13, 17, 19, 23, 29, 31, etc., one obtains the random digits 3, 7, 1, 3, 7, 9, 3, 9, 1, 7, 1, 3, 7, 3, 9, 1, 7, 1, 3, 9, 3, 9, 7 for primes from 3 to 97. These digits form an infinite set, and no digit can be derived from the previous or succeeding ones. Each one of the four digits appears 25% of the time. Above all, they are absolutely non-periodic.

The prime-number formula based on the T-sequence polynomial-time primality testing algorithm provides infinitely many variations of these random prime digits, e.g., take 2×3×5×7=210. Based on the formula presented previously, add or subtract all the primes between 7<11 and 47<72, to test each sum or difference for primality. From the seed 210 onward one obtains the sums +1, +11, +13, +17, . . . +47 which give this set of random digits: 1, 3, 7, 9, 3, 9, 1, 1, 7 from 211 to 257. The differences −1, −1, −13, −17, . . . −47 give another set of random digits: 9, 7, 3, 1, 1, 9, 3, 3, 7, 3 from 199 back to 163. Of course, the foregoing primality testing algorithm can be used generate an abundance of large primes such as cannot be generated in any other way.

Since the seeds such as $2 \cdot 3 \cdot 5$ or $2^2 \cdot 3^2 \cdot 5 \cdot 7$, etc. can be varied in infinitely many ways, the set of last prime digits can also be generated and arranged in all sorts of arbitrary ways. The seeds can be added or subtracted in any which way too. Without a complete knowledge of the exact seeds and their mathematical operations, no one can reproduce or deduce this type of random digits of the primes. These random digits of primes behave in just as chaotic fashion as the physical sub-atomic particles in their distribution. Therefore this method can conveniently generate any length of random digits or numbers desired to use in mathematical research or industrial simulation. This generator of random digits can be implemented easily and efficiently in both hardware and software. Conventional RNGs such as linear or non-linear feedback shift registers always carry period patterns which are inherent. Non-periodicity is inherent in the foregoing random prime digit generator.

This RNG can also be easily modified into a simple but innovative cipher: a function $F_1$ (such as transposition, shuffling, etc.) that operates on the last prime digit and another function $F_2$ that computes and determines the seeds are both kept secret. $F_2$ is coupled to a simple but chaotic physical system such as dice-throwing, radioactive matter, etc., for the first random input as seeds. The functions $F_2$ and $F_1$ are used to generate a truly random string of digits such as 9, 7, 3, 1, 1, 9, 3, 3, 7, 3, 1, 3, 7, 9, 3, 9, 1, 1, 7. This string of random digits can be used as a one-time pad for encryption. The receiver who is informed only of the starting seeds (from the physical system input) can decrypt the ciphertext to obtain the plaintext since he also possesses $F_1$ and $F_2$ as well as the relevant table of primes like the sender. As long as $F_1$ and $F_2$ are kept secret, no eavesdropper can decrypt the ciphertext. The cipher can even be timed accordingly so that the functions $F_1$ and $F_2$ change according to time changes or context changes. In any event, math theory about primes guarantees that the string of random digits thus generated are absolutely chaotic. No fixed inter-relationship can be derived from among themselves.

FIG. 1 is a block diagram of a prime number generating computing system 20. The system 20 includes a memory 22 for storing the data and applications for the prime number generating system, CPU 24, input/output elements 26, and optionally a read-only memory 28. The memory 22 is preferably a random access memory. The application and data in the memory 22 includes a t-sequence generator 30, a P testing portion 32, a P generating portion 34, an R generating portion 36 and a factor portion 38. The memory 22 can also include other program and data structures 38.

FIG. 2 illustrates a flowchart of a primality testing algorithm. In step 50, the L type of N in $T^3$ is determined. In step 52, the values of $R^3_{N-1}$ and $R^3_N$ are calculated. In step 54, it is determined whether $R^3_{N-1}$ is equal to 2 or 7. If not, in step 56, N is declared to be composite. If so, in step 58, it is checked whether L is found. If not, N is declared to be composite. If L is found, in step 60, it is checked whether the greatest common denominator of $(R_d^L - 2)$ and N is equal to 1. If not, N is declared to be composite. In step 62, a search of L is done for having opposite L type N in $T^3$. N is declared to be prime in step 64.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A computer-implemented method for generating prime numbers for data encryption via a computer system, wherein the computer system comprises one or more processors, a random-access memory, a read-only (non-volatile) memory, and an I/O subsystem, the method comprising:

determining at least one element of a T-sequence, the T-sequence being one of a family of related non-montonic sequences and being defined as: $T^l_0 = 2$, $T^l_1 = l$ and $T^l_{n+1} = l \cdot T^l_n - T^l_{n-1}$, wherein the subscript denotes the nth term while the superscript denotes the order l, such that the zeroth term is 2 and the first term is l, and wherein l=3 is the first T-sequence, and each successive term is defined as follows: $T^3_0=2$, $T^3_1=3$, $T^3_2=7$, $T^3_3=18, \ldots, T^3_{n+1}=3 \cdot T^3_n - T^3_{n-1}$;

using said at least one element to determine primality of at least one arbitrary positive integer by performing a binary decomposition on the at least one arbitrary positive integer in polynomial time;

wherein within the random-access memory and the read-only memory a routine is stored for generating T-sequence terms, and wherein the routine is used by one or more other routines, the one or more routines including a primality testing routine, a factoring routine, a prime number generator, and/or a random number generator; and encrypting data using a cryptographic function for data security within a computer system or network utilizing the primality of at least one arbitrary positive integer determined by the binary decomposition.

2. The method of claim 1, where l=4 is the second T-sequence and each successive term is defined as follows:

$$T^4_0=2, T^4_1=4, T^4_2=14, T^4_3=52, \ldots, T^4_{n+1}= 4 \cdot T^4_n - T^4_{n-1}, \text{ etc.}$$

3. The method of claim 1, wherein all T-terms are expressed by:

$$T^l_{n1+n2}=T^l_{n1} \cdot T^l_{n1-n2} \text{ where } n_1 \geq n_2 \text{ and } n=n_1+n_2.$$

4. The method of claim 3, wherein:

$$T^l_{2n+1}=T^l_{n1} \cdot T^l_{n+1} T^l_n \cdot T^l_{n+1}-l, \text{ for odd } n\text{th terms; and}$$

$$T^l_{2n}=T^l_n \cdot T^l_n - T^l_0 = (T^l_n)^2 - 2, \text{ for even } n\text{th terms.}$$

5. The method of claim 1, comprising:
identifying the primality of the at least one positive integer in polynomial time by obtaining definitive characteristics of the positive integer's quadratic residue.

6. A non-transitory computer readable storage medium containing instructions for a computer-implemented method of generating a prime number for data encryption via a computer system, wherein the computer system comprises one or more processors, a random-access memory, a read-only (non-volatile) memory, and an I/O subsystem, the computer-implemented method of generating the prime number for data encryption comprising:
generating candidate numbers by forming at least one of sums and differences of a given number and a series of prime numbers;
deterministically evaluating primality of each of the candidate numbers in polynomial time, wherein said means for deterministically evaluating primality comprises means for determining at least one element of a non-montonic sequence, the non-montonic sequence being one of a family of related non-montonic sequences, and wherein said family of related non-montonic sequences is defined as follows: $T^l_0=2$, $T^l_1=1$ and $T^l_{n+1}=l \cdot T^l_n - T^l_{n-1}$, wherein the subscript denotes the nth term while the superscript denotes the order l;
identifying the primality of the candidate numbers in polynomial time by performing a binary decomposition on the candidate numbers;
wherein within the random-access memory and the read-only memory a routine is stored for generating T-sequence terms, and wherein the routine is used by one or more other routines, the one or more routines including a primality testing routine, a factoring routine, a prime number generator, and/or a random number generator; and
encrypting data using a cryptographic function for data security within a computer system or network utilizing one or more of the candidate numbers identified in polynomial time as prime numbers.

7. The non-transitory computer readable storage medium of claim 6, wherein l=3 is the first T-sequence, and each successive term is defined as follows:

$$T^3_0=2, T^3_1=3, T^3_2=7, T^3_3=18, \ldots, T^3_{n+1}= 3 \cdot T^3_n - T^3_{n-1}.$$

8. The non-transitory computer readable storage medium of claim 6, comprising:
identifying the primality of the number in polynomial time by obtaining definitive characteristics of the number's quadratic residue.

9. A non-transitory computer readable storage medium containing instructions for a computer-implemented method of generating a prime number for a data encryption system in polynomial time via a computer system, wherein the computer system comprises one or more processors, a random-access memory, a read-only (non-volatile) memory, and an I/O subsystem, the computer-implemented method of generating the prime number for the data encryption system in polynomial time comprising:
performing a first step, which comprises:
determining at least one element of a T-sequence, the T-sequence being defined as: $T^l_0=2$, $T^l_1=1$ and $T^l_{n+1}=l \cdot T^l_n - T^l_{n-1}$ wherein the subscript denotes the nth term while the superscript denotes the order l; and performing a first step, wherein the first step comprises for any given positive integer n, wherein l=3, wherein determining the l type of n in $T^3$, and wherein any n with a last digit 1 or 9 will be of a −1 type, and any n with a last digit of 3 or 7 will be of a +1 type; and
computing at least two residues $R^3_{n-1}=T^3_{n-1} \pmod{n}$ and $R^3_n=T^3_n \pmod{n}$, wherein, if either $R^3_{n-1} \neq 2$ or 7 ($=l^2-2$) and/or $R^3_n \neq 3$, then n can be declared to be a composite, and wherein all composites which are not genuine primes or pseudoprimes or proper cofactors of $T^3$ will be detected and sieved away;
if $R^3_{n-1}=2$ or 7 ($=l^2-2$) $\pmod{n}$ and $R^3_n=3 \pmod{n}$ then performing a second step comprised of a greatest common factor sieving to sieve away certain pseudoprimes, and wherein the greatest common factor sieving further comprises:
using an Euclidean algorithm to obtain a greatest common factor; and
computing the greatest common factor, wherein for n to be a candidate for prime, the odd term residue $R_d^3$ right under $R_n^3$ when 2 is subtracted must at least be coprime to n, and wherein the greatest common denominator of $R_d^l-2$ and n is equal to 1;
performing a third step, wherein the third step is performed if the second step of performing the greatest common factor sieving misses some pseudoprimes or cofactor composites, and wherein all possible exceptions in the form of proper cofactors or pseudoprimes will be sieved away, leaving only the genuine primes;
wherein within the random-access memory and the read-only memory a routine is stored for generating T-sequence terms, and wherein the routine is used by one or more other routines, the one or more routines including a primality testing routine, a factoring routine, a prime number generator, and/or a random number generator; and encrypting data using a cryptographic function for data security within a computer system or network utilizing one or more of the genuine primes left in the third step.

10. The non-transitory computer readable storage medium of claim 9, wherein the third step of sieving further comprises finding an l which is of opposite l type to that in the first step of $T^3$.

11. The non-transitory computer readable storage medium of claim 10, wherein if in the first step the l type of n in $T^3$ is negative, then in the third step, finding an l for which the l type of n is positive in T l and vice versa.

12. The non-transitory computer readable storage medium of claim 11, wherein the third step comprises computations of small residue r or direct computations of $T^l_{n-1} \equiv 2$ or $l^2 - 2$ (mod n) and $T^l_n \equiv 1$ (mod n).

13. The non-transitory computer readable storage medium of claim 12, wherein if in the first step $T^3_{n-1} \equiv 2$ (mod n) and $T^3_n \equiv 3$ (mod n) is of the −l type, then for another l in which the l type of n in $T^l$ is opposite to that in $T^3$ and wherein $T^l_{n-1} \equiv l^2 - 2$ (mod n) and $T^l_n \equiv 1$ (mod n), such that the +l type, n will be a genuine prime.

14. The non-transitory computer readable storage medium of claim 13, comprising:
using a Jacobi method to avoid blind trials seeking for opposite l types.

15. The non-transitory computer readable storage medium of claim 14, comprising:
wherein the Jacobi method is defined as $l^{2-4}$, n; and
calculating the l types beginning with l=3 until the lowest values of l having opposite types have been found.

16. The non-transitory computer readable storage medium of claim 9, comprising:
identifying the primality of the number in polynomial time by obtaining definitive characteristics of the number's quadratic residue.

\* \* \* \* \*